(12) United States Patent
McKinnon et al.

(10) Patent No.: US 7,874,520 B2
(45) Date of Patent: Jan. 25, 2011

(54) SATELLITE WITH DEPLOYABLE, ARTICULATABLE THERMAL RADIATORS

(75) Inventors: Douglas V. McKinnon, Montgomery Township, NJ (US); David M. Brown, Upper Makefield, PA (US); David J. Hentosh, Yardley, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 521 days.

(21) Appl. No.: 11/385,586

(22) Filed: Mar. 21, 2006

(65) Prior Publication Data

US 2007/0221787 A1  Sep. 27, 2007

(51) Int. Cl.
  *B64G 1/50* (2006.01)
  *B64G 1/52* (2006.01)
(52) U.S. Cl. ............................... 244/171.8; 244/172.6
(58) Field of Classification Search .............. 244/171.7, 244/171.8, 172.6
See application file for complete search history.

(56) References Cited

U.S. PATENT DOCUMENTS

| | | | | |
|---|---|---|---|---|
| 4,133,502 A * | 1/1979 | Anchutin | ................ | 244/172.6 |
| 4,747,567 A * | 5/1988 | Johnson et al. | ........... | 244/172.6 |
| 4,830,097 A * | 5/1989 | Tanzer | ................. | 165/41 |
| 4,834,325 A * | 5/1989 | Faget et al. | ............. | 244/159.4 |
| 5,211,360 A * | 5/1993 | Zimbelman | ................ | 244/164 |
| 5,697,582 A * | 12/1997 | Surauer et al. | .............. | 244/168 |
| 5,806,801 A * | 9/1998 | Steffy et al. | ............... | 244/158.6 |
| 5,927,654 A * | 7/1999 | Foley et al. | ............... | 244/172.6 |
| 6,003,817 A * | 12/1999 | Basuthakur et al. | ......... | 244/164 |
| 6,098,931 A * | 8/2000 | Bard | .................. | 244/171.8 |
| 6,102,339 A * | 8/2000 | Wu et al. | ................ | 244/171.8 |
| 6,220,548 B1 * | 4/2001 | Hyman | ................... | 244/172.6 |
| 6,378,809 B1 | 4/2002 | Pon | .................... | 244/173 |
| 6,394,395 B1 | 5/2002 | Poturalski et al. | | |
| 6,581,883 B2 * | 6/2003 | McGee et al. | ............. | 244/172.6 |
| 6,595,470 B2 * | 7/2003 | Keeler et al. | ............. | 244/172.6 |
| 6,669,147 B2 * | 12/2003 | Bertheux et al. | .......... | 244/172.6 |
| 6,784,359 B2 * | 8/2004 | Clark et al. | ................ | 136/245 |
| 7,028,953 B2 * | 4/2006 | Sebata et al. | ............. | 244/171.8 |
| 7,036,772 B2 | 5/2006 | Walker et al. | | |

OTHER PUBLICATIONS

Pixley, Challenges of Space Station Navigation, The Institute of Navigation, Proceedings of the Forty-First Annual Meeting, Jun. 25-27, pp. 90-93 [NASA Center for Aerospace Information (CASI) 19850101; Jan. 1985].

Heizer et al., A Steerable Radiator for Spacecraft Application, AIAA/ASME 4th Joint Thermophysics and Heat Transfer Conference, Jun. 1986, pp. 1-6, AIAA-86-1298, American Institute of Aeronautics and Astronautics.

(Continued)

*Primary Examiner*—Tien Dinh
*Assistant Examiner*—Joseph Sanderson
(74) *Attorney, Agent, or Firm*—McDermott Will & Emery LLP

(57) ABSTRACT

A satellite (50) is disclosed having at least one deployable thermal radiator (64). Once deployed, this thermal radiator (64) may be repositioned. In one embodiment, the deployed thermal radiator (64) may be moved about a first axis (74), about a second axis (76), or both to move the deployed thermal radiator (64) from one deployed position to another deployed position.

20 Claims, 12 Drawing Sheets

OTHER PUBLICATIONS

Wise et al., Direct Broadcast Satellite—A Thermal Design Challenge, SAE Technical Paper Series, Fifteenth Intersociety Conference on Environmental Systems, San Francisco, Ca., Jul. 15-17, 1985.

Gedeon, Description and Orbit Data of Variable-Conductance Heat-Pipe System for the Communications Technology Satellite, NASA Technical Paper 1465, Aug. 1979, pp. 1-20.

Joy et al., Advanced Thermal and Power Systems for the Satcom-Ku Satellites, pp. 697-704, American Institute of Aeronautics and Astronautics, Inc., 1986.

Lu, Orientation of Space Station Freedom Electrical Power System in Environmental Effects, Proceedings of the 25th Intersociety Energy Conversion Engineering Conference, Aug. 1990, pp. 1-6, American Institute of Chemical Engineers.

Giovagnoli, An Advanced Thermal Control for the French-German Direct to Home Broadcasting Satellites TDF1/TV-SAT, 33rd Congress, IAF '82, Paris, France, Sep. 27-Oct. 2, 1982.

Notification Of Transmittal Of The International Search Report And The Written Opinion Of The International Searching Authority, Or The Declaration. International Application No. PCT/US07/60501. Mail Date Jun. 25, 2008.

* cited by examiner

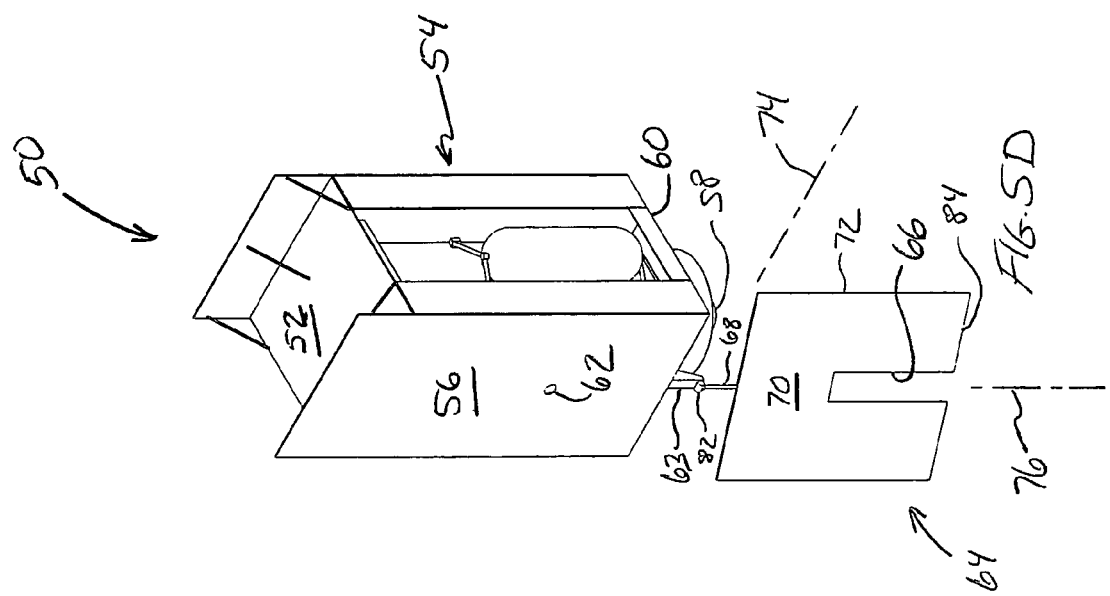
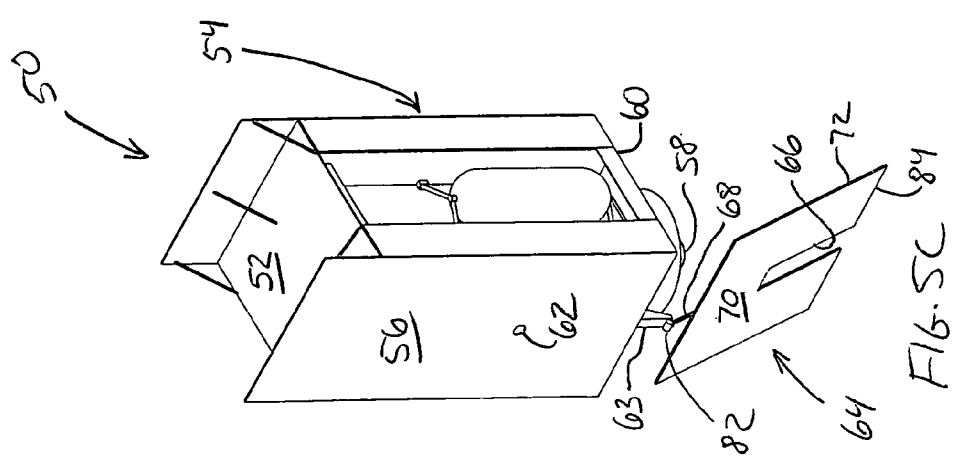

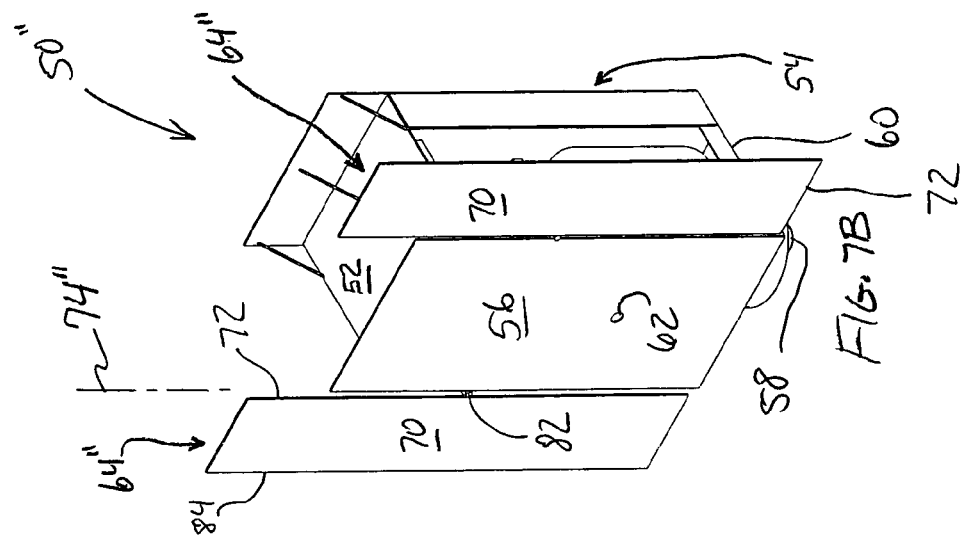
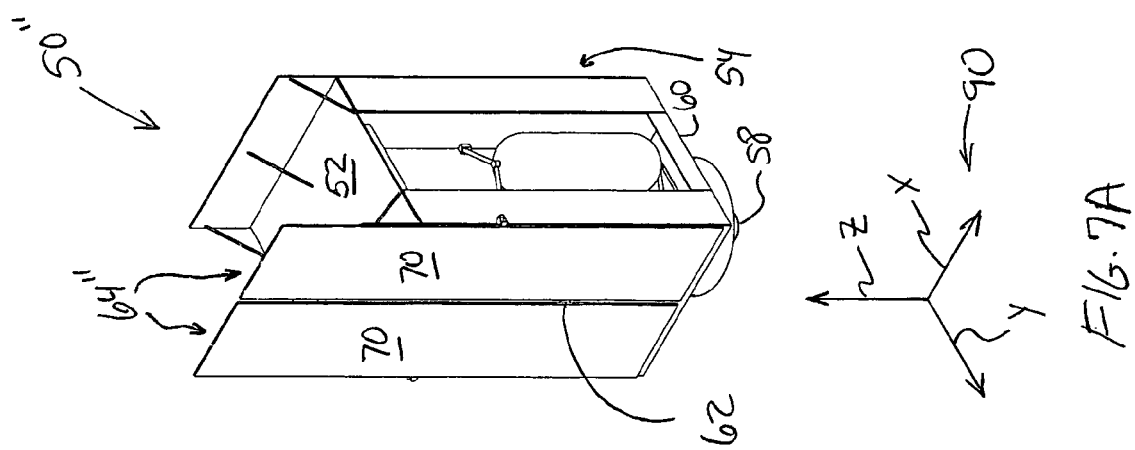

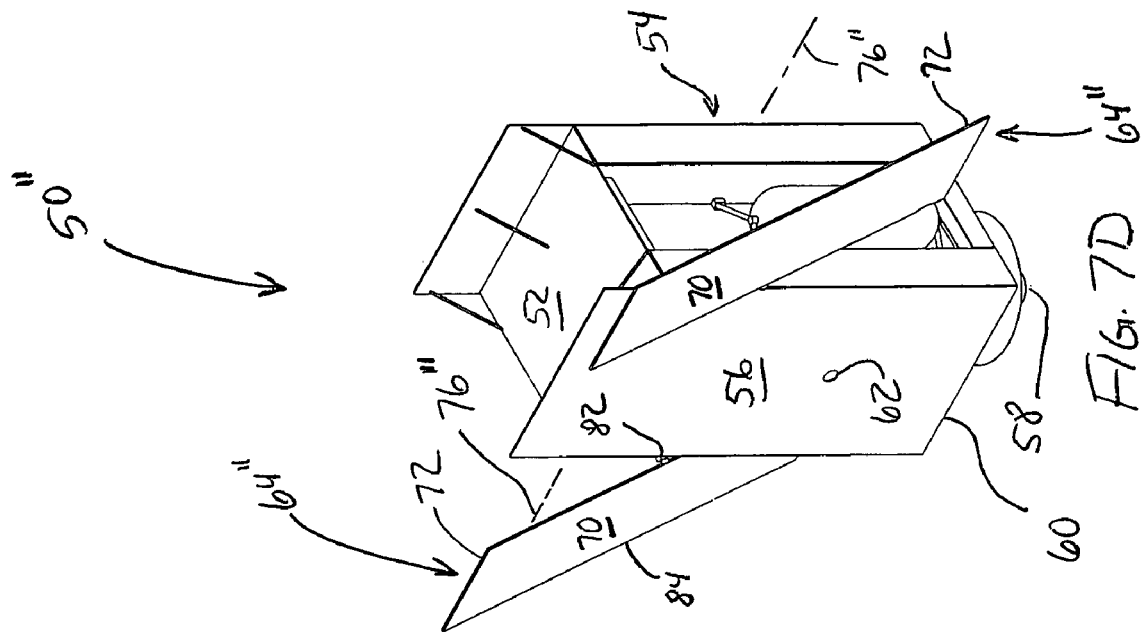
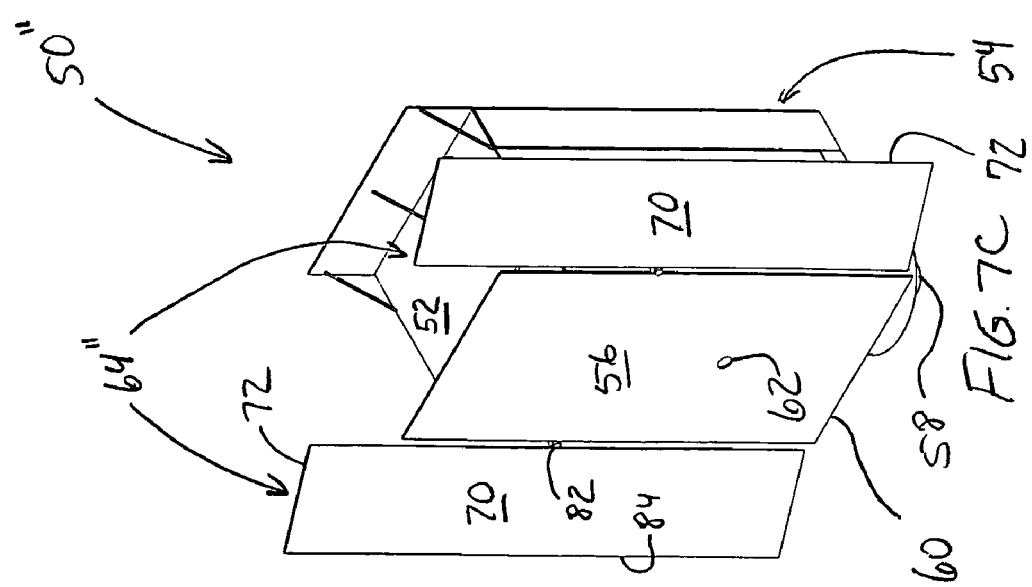

| Season | June Solstice | | September Equinox | | December Solstice | | March Equinox | |
| --- | --- | --- | --- | --- | --- | --- | --- | --- |
| Hour of the day (Satellite Local Time) | Axis 74 - angle (deg) | Axis 76 - angle (deg) | Axis 74 - angle (deg) | Axis 76 - angle (deg) | Axis 74 - angle (deg) | Axis 76 - angle (deg) | Axis 74 - angle (deg) | Axis 76 - angle (deg) |
| 0 | 23.5 | 0 | 0 | 0 | -23.5 | 0 | 0 | 0 |
| 6 | 0 | -23.5 | 0 | 0 | 0 | 23.5 | 0 | 0 |
| 12 | -23.5 | 0 | 0 | 0 | 23.5 | 0 | 0 | 0 |
| 18 | 0 | 23.5 | 0 | 0 | 0 | -23.5 | 0 | 0 |
| 24 | 23.5 | 0 | 0 | 0 | -23.5 | 0 | 0 | 0 |

FIG. 9C

US 7,874,520 B2

SATELLITE WITH DEPLOYABLE, ARTICULATABLE THERMAL RADIATORS

FIELD OF THE INVENTION

The present invention generally relates to the field of satellites and, more particularly, to satellites that use deployable radiators whose position may be adjusted after deployment.

BACKGROUND OF THE INVENTION

A satellite may be placed in various orbits about Earth. What is commonly referred to as a geosynchronous orbit is one where the satellite orbits Earth once each day. This requires that the satellite be located about 35,800 kilometers or 22,300 miles above the Earth's surface. The satellite's orbital period at this particular altitude should match the rate at which the Earth rotates about its polar axis. Comparatively, both the International Space Station and the Space Shuttle orbit in what is commonly referred to as a Low Earth Orbit. The International Space Station orbits Earth at an altitude of about 400 kilometers above the Earth's surface, while the Space Shuttle commonly orbits Earth at an altitude of about 300 kilometers above the Earth's surface. A satellite that is in a geosynchronous orbit hereafter may be referred to as a "geosynchronous satellite."

Deployable thermal radiators are common in commercial, civil and government satellite systems. Many larger satellites with significant thermal dissipation requirements are currently using deployable thermal radiators with fixed deployment positions. The thermal radiator's fixed deployed position is chosen to optimize the thermal dissipation capability while taking into account sun-angles and other spacecraft design driving requirements (e.g., solar array blockage, antenna blockage, thruster plume impingement). By fixing the deployed position of the thermal radiator for the entire mission, the current art makes a compromise against all competing parameters and thus may not provide the maximum capability at a given time.

SUMMARY OF THE INVENTION

A first aspect of the present invention is generally embodied by a satellite. The satellite associated with the first aspect includes a first thermal radiator. The first thermal radiator is deployable from a stowed position to a first deployed position. Thereafter, the first thermal radiator is also articulatable or repositionable after the first thermal radiator has assumed its first deployed position so as to be able to move from the first deployed position to a second deployed position.

Various refinements exist of the features noted in relation to the first aspect of the present invention. Further features may also be incorporated in the first aspect of the present invention as well. These refinements and additional features may exist individually or in any combination. In one embodiment, the satellite is in a geosynchronous orbit, including a geostationary orbit. Although the first aspect is particularly suited for a geosynchronous satellite, the satellite of the first aspect may be placed in any appropriate orbit. The satellite also may be of any appropriate configuration, may provide any appropriate function (e.g., communications, Earth imaging, weather monitoring, astronomy), and may be of any appropriate type (e.g., three-axis stabilized; spinning). One or more antennas may be utilized by the satellite and for any purpose, one or more these antennas may be deployable, and each antenna may be of any appropriate size, shape, configuration, and/or type. One or more solar panels/arrays or other on-board power sources also may be utilized by the satellite, each of which may be of any appropriate size, shape, configuration, and/or type, and each of which may be in the form of deployable or fixed structures. Any appropriate number of first thermal radiators may also be used by the satellite, including using multiple first thermal radiators.

The first thermal radiator may be of any appropriate size, shape, and/or configuration in accordance with the first aspect. Any appropriate motion or combination of motions may be utilized to deploy the first thermal radiator, or to move the first thermal radiator from its stowed position to its first deployed position. In one embodiment, this deployment is a motion that is in a first dimension (e.g., a pivoting motion; a translation, axial, or sliding motion). The deployment of the first thermal radiator into its first deployed position could use motions in multiple dimensions as well. In any case, the adjustment of the position of the first thermal radiator after its initial deployment may use any appropriate motion or combination of motions as well (e.g., a pivoting motion; a translation, axial, or sliding motion). For instance, this adjustment could use any motion of the first thermal radiator that is in a first dimension, in a second dimension that is different than the first dimension, or both. In one embodiment, the motion of the first thermal radiator is about a single axis in moving from the stowed position to the first deployed position, and the motion of the first thermal radiator in moving from its first deployed position to its second deployed position is limited to being about no more than two axes.

The first deployed position in the case of the first aspect corresponds with the initial position that is assumed by the first thermal radiator in moving from its stowed position (e.g., the stowed position being the position of the thermal radiator during at least the initial portion of the flight from Earth). The deployment and subsequent repositioning of the first thermal radiator is subject to a number of characterizations. One is that the first thermal radiator may be in a non-operational state when it moves from its stowed position to its first deployed position (e.g., no coolant flowing through the first thermal radiator), operation of the first thermal radiator may be initiated any time after the first thermal radiator has been initially deployed from its stowed position (e.g., coolant may begin flowing through the first thermal radiator), and the first thermal radiator may be operational as it is moved from its first deployed position to its second deployed position (e.g., coolant may be flowing through the first thermal radiator). Another characterization is that a change in position of the first thermal radiator in moving from its stowed position to its first deployed position may be of a first magnitude (e.g., by traveling through a range of motion of greater than about 90°), and that a change in position of the first thermal radiator in moving from its first deployed position to its second deployed position may be of a second magnitude that is less than the first magnitude (e.g., by traveling through a range of motion of no more than about 90°, and possibly through a range of motion of only a few degrees). Finally, the first thermal radiator may be in a stationary position relative to a body of the satellite when in each of its first and second deployed positions (e.g., the motion of the first thermal radiator may be terminated after reaching its first deployed position, and the motion of the first thermal radiator may be terminated after reaching its second deployed position after being repositioned as desired/required).

The repositioning of the first thermal radiator after its initial deployment may be undertaken for any appropriate purpose and at any appropriate time. For instance, the repositioning may be to maintain the first thermal radiator "on edge" with the sun or to reduce the angle of incidence of the sun's rays on the thermal radiating surface(s) of the first thermal radiator. The first thermal radiator could undergo a repositioning on a seasonal basis, on a daily basis, on any desired/required schedule, or as otherwise desired/required. The repositioning may also be for purposes of adjusting the amount of heat that is being rejected by the first thermal radiator. Yet another possibility is that the repositioning may be for purposes of increasing the exposure of the thermal radiating surface(s) of the first thermal radiator to the sun's rays (e.g., to "thaw out" the first thermal radiator).

The original or first deployed position of the first thermal radiator for the satellite of the first aspect may be established or controlled in any appropriate manner (e.g., "pre-set" or established prior to the launching of the satellite). Any appropriate basis may be used for initiating a repositioning of the first thermal radiator. For instance, the first thermal radiator could be repositioned based upon the receipt of a control signal from a ground station on Earth that is communicating with the satellite. Another option would be to use a repositioning sequence for controlling the repositioning of the first thermal radiator. For instance, this repositioning sequence could be stored on or accessed by a controller that would then run the first thermal radiator through a set of positions based upon prior knowledge of the position of the satellite relative to the Earth and/or Sun. Yet another option would be to control the repositioning of the first thermal radiator based upon feedback from one or more relevant sensors (e.g., temperature sensors, power sensors). Such a closed loop system may use any appropriate algorithm to reposition the first thermal radiator to achieve any desired result.

The satellite of the first aspect may include a second thermal radiator that is always maintained in a fixed position relative to a body of the satellite. In one embodiment, the first thermal radiator is stowed at least generally on or at least generally adjacent to the second thermal radiator. In any case, the first thermal radiator may be of any appropriate size, shape, configuration, and/or type. What is important in relation to the first thermal radiator is that it is deployable from a stowed position, and that once deployed, it is thereafter movable in any appropriate manner to another position and for any purpose as noted above. Any appropriate mechanism may be used to initially deploy the first thermal radiator, any appropriate mechanism may be used to thereafter re-position the first thermal radiator after being initially deployed, or any appropriate, common mechanism may be used to both initially deploy the first thermal radiator and thereafter re-position the first thermal radiator.

The first thermal radiator may be disposed at any appropriate location in its first deployed position in the case of the first aspect. For instance, the first thermal radiator may cantilever from a body of the satellite in its first deployed position. The free end of the first thermal radiator could be that portion of the first thermal radiator that is furthest from the Earth when the satellite of the first aspect is in orbit. Another option would be for this free end of the first thermal radiator to be a leading portion of the first thermal radiator in relation to the orbital path of the satellite of the first aspect (e.g., the first thermal radiator could extend from the body of the satellite in the direction that the satellite is traveling along its orbital path). Yet another option would be for this free end of the first thermal radiator to be a trailing portion of the first thermal radiator in relation to the orbital path of the satellite of the first aspect (e.g., the first thermal radiator could extend from the body of the satellite in the opposite direction that the satellite is traveling along its orbital path). Yet another option would be for the first thermal radiator to extend from the body of the satellite in the direction of Earth when the satellite is in orbit.

The first thermal radiator in the case of the satellite of the first aspect may be characterized as a cantilevered structure as noted above. In one embodiment, a free end of this cantilevered first thermal radiator moves progressively further away from the Earth during at least a portion of the movement of the first thermal radiator from its stowed position to its first deployed position. In another embodiment, a free end of this cantilevered first thermal radiator progressively moves further in the direction of the travel of the satellite along its orbital path during at least a portion of the movement of the first thermal radiator from its stowed position to its first deployed position. In yet another embodiment, a free end of this cantilevered first thermal radiator progressively moves further in the direction that is opposite of the direction of the travel of the satellite along its orbital path during at least a portion of the movement of the first thermal radiator from its stowed position to its first deployed position. In yet another embodiment, a free end of this cantilevered first thermal radiator moves progressively further toward Earth during at least a portion of the movement of the first thermal radiator from its stowed position to its first deployed position.

There are yet other characterizations that can be made in relation to the position/orientation of the first thermal radiator when it is in its first deployed position in the case of the first aspect. Consider the case where the satellite further includes a nadir panel that always faces Earth when the satellite is in orbit, and an anti-nadir panel that is positioned directly opposite of the nadir panel and that always faces directly away from Earth when the satellite is in orbit. In one embodiment, the first thermal radiator is located at an altitude from Earth that is somewhere between an altitude of the nadir panel from Earth and an altitude of the anti-nadir panel from Earth when the first thermal radiator is in its stowed position, and the anti-nadir panel is located at an altitude from Earth that is somewhere between an altitude of the nadir panel from Earth and an altitude of the primary radiating surface(s) of the first thermal radiator from Earth when the first thermal radiator is in its first deployed position. In another embodiment, the primary radiating surfaces of the first thermal radiator may be characterized as being spaced from the anti-nadir panel in an anti-nadir direction when in its first deployed position.

Consider the case where the satellite of the first aspect includes a body that in turn includes a nadir panel that always faces Earth when the satellite is in orbit, where the first thermal radiator includes first, second, third, and fourth edges, where the first edge is that portion of the first thermal radiator closest to the body when the first thermal radiator is in its first deployed position, where the second edge is that portion of the first thermal radiator that is furthest from the body when the first thermal radiator is in its first deployed position, and where the third and fourth edges each extend between the first and second edges. The first, second, third, and fourth edges may define an entire perimeter of the first thermal radiator. In any case and in a first embodiment, an entirety of the second edge is disposed further from Earth than the entirety of the first edge when the satellite of the first aspect is in orbit. In a second embodiment, the first and second edges are spaced from each other along an orbital path of the satellite when in orbit. In a third embodiment, the second edge of the first thermal radiator is either a leading edge or a trailing edge of the first thermal radiator when the satellite is in orbit.

The first thermal radiator may move in a first dimension (including being limited to movement in the first dimension)

proceeding from its stowed position to the first deployed position in the case of the first aspect. After the first thermal radiator has assumed its first deployed position, the first thermal radiator may be repositioned at any appropriate time, for any appropriate purpose, and any appropriate number of times. In one embodiment, this repositioning is provided by a movement of the first thermal radiator in a first dimension (including being limited to movement in the first dimension), by a movement of the first thermal radiator in a second dimension (including being limited to movement in the second dimension) that is different than the first dimension, or by a movement of the first thermal radiator in both the first and second dimensions. The first and second dimensions may be orthogonal to each other, with the second dimension corresponding with an axis extending from the satellite to Earth, and with the first dimension being contained within the orbital plane of the satellite.

The first thermal radiator may be articulatable about a single reference axis in moving from the first deployed position to the second deployed position in the case of the first aspect. In one embodiment, this single reference axis is at least generally orthogonal to an axis extending between Earth and the satellite when in orbit and is within the orbital plane of the satellite. In another embodiment, the first thermal radiator moves about this single reference axis when moving from its stowed position to its first deployed position as well.

The first thermal radiator may be articulatable about first and second reference axes in moving from the first deployed position to the second deployed position in the case of the first aspect. In one embodiment, this first reference axis is at least generally orthogonal to an axis extending between Earth and the satellite and is within the orbital plane of the satellite when in orbit. In another embodiment, the first thermal radiator moves about this first reference axis when moving from its stowed position to its first deployed position as well. In another embodiment, the second reference axis is at least generally orthogonal to the first reference axis. In yet another embodiment, the second reference axis extends at least generally in the direction of the Earth when the satellite is in orbit.

The satellite of the first aspect may include a body. In one embodiment, a first gimbal movably interconnects the first thermal radiator with the body. This first gimbal may accommodate movement of the first thermal radiator from the stowed position to the first deployed position, and further may accommodate movement of the first thermal radiator from the first deployed position to a second deployed position. In another embodiment, first and second gimbals movably interconnect the first thermal radiator with the body. This first gimbal in this instance may accommodate movement of the first thermal radiator from the stowed position to the first deployed position, and further may accommodate movement of the first thermal radiator from the first deployed position to a second deployed position. The second gimbal may also accommodate movement of the first thermal radiator from the first deployed position to the second deployed position, but alone is unable to move the first thermal radiator from a stowed position to its first deployed position. The first and second gimbals could each be used individually to move the first thermal radiator from its first deployed position to its second deployed position. The first and second gimbals could be sequentially used in any order to move the first thermal radiator from its first deployed position to its second deployed position. Finally, the first and second gimbals could be simultaneously used to move the first thermal radiator from its first deployed position to its second deployed position. Any manner of using one or both of the first and second gimbals could be utilized to allow the first thermal radiator to move from its first deployed position to its second deployed position.

A second aspect of the present invention is embodied by a spacecraft. This spacecraft is generally in the form of a launch vehicle having one or more stages, as well as a payload fairing that is interconnected with and propelled by the launch vehicle, and further that contains or shrouds a geosynchronous satellite during at least an initial portion of the flight of the launch vehicle. This geosynchronous satellite has at least one deployable, and thereafter repositionable, thermal radiator.

Various refinements exist of the features noted in relation to the second aspect of the present invention. Further features may also be incorporated in the second aspect of the present invention as well. These refinements and additional features may exist individually or in any combination. Initially, the various features discussed above in relation to the satellite associated with the first aspect may be used by the geosynchronous satellite associated with the subject second aspect, individually or in any combination. The payload fairing may be jettisoned at any appropriate time during the flight, as may the geosynchronous satellite. If the launch vehicle uses multiple stages, these stages may be sequentially jettisoned as well. Typically the geosynchronous satellite will be jettisoned from the launch vehicle in outer space (with the payload fairing typically having been jettisoned earlier in the flight). Thereafter, the geosynchronous satellite may be propelled further out to the desired geosynchronous orbit in any appropriate manner. One or more thermal radiators of the satellite may be deployed at any appropriate time, for instance after the satellite is in its geosynchronous orbit. After the thermal radiator(s) has assumed its initially deployed position, the thermal radiator may be repositioned as desired/required.

A third aspect is embodied by a method for operating a satellite. The satellite may be placed in a geosynchronous orbit (although the satellite may be placed in any appropriate orbit). In any case, a first thermal radiator is deployed from a stowed position to a deployed position, and a position of the first thermal radiator is thereafter adjusted sometime after its initial deployment.

Various refinements exist of the features noted in relation to the third aspect of the present invention. Further features may also be incorporated in the third aspect of the present invention as well. These refinements and additional features may exist individually or in any combination. Initially, the various features discussed above in relation to the satellite associated with the first aspect may be used by the satellite associated with the subject third aspect, individually or in any combination. The noted geosynchronous orbit is about 22,300 miles above Earth's surface, and any appropriate way of transporting the satellite to this geosynchronous orbit may be utilized. In one embodiment, an appropriate launch vehicle (e.g., multi-stage; Space Shuttle) flies the satellite from Earth to a location in outer space (e.g., corresponding with an altitude associated with a Low Earth Orbit, such as 300-400 kilometers above Earth's surface), and thereafter a different propulsion source is used to fly the satellite to an altitude corresponding with the desired geosynchronous orbit. Typically, the first thermal radiator (as well as various other components of the satellite) will remain in a stowed position at least while associated with the launch vehicle. That is, only after the satellite has been jettisoned from the associated launch vehicle will the first thermal radiator typically be deployed (including only after the satellite has reached it's a geosynchronous orbit).

As in the case of the first aspect, the satellite of the subject third aspect may be of any appropriate configuration, may provide any appropriate function (e.g., communications, Earth imaging, weather monitoring, astronomy), and may be of any appropriate type (e.g., three-axis stabilized; spinning). One or more antennas may be utilized by the satellite and for any purpose, one or more these antennas may be deployable, and each antenna may be of any appropriate size, shape, configuration, and/or type. One or more solar panels/arrays or other on-board power sources also may be utilized by the satellite, each of which may be of any appropriate size, shape, configuration, and/or type, and each of which may be in the form of deployable or fixed structures. Any appropriate number of first thermal radiators may also be used by the satellite, including using multiple first thermal radiators.

BRIEF DESCRIPTION OF THE SEVERAL VIEWS OF THE DRAWING

FIG. 5C is a perspective view of the satellite of FIG. 5A, illustrating one type of motion for repositioning the thermal radiator after its initial deployment.

FIG. 5D is a perspective view of the satellite of FIG. 5A, illustrating another type of motion for repositioning the thermal radiator after its initial deployment.

FIG. 7A is a perspective schematic of a satellite with a deployable, articulatable thermal radiator in its stowed position.

FIG. 7B is a perspective view of the satellite of FIG. 7A with the thermal radiator in a first deployed position.

FIG. 7C is a perspective view of the satellite of FIG. 7A, illustrating one type of motion for repositioning the thermal radiator after its initial deployment.

FIG. 7D is a perspective view of the satellite of FIG. 7A, illustrating another type of motion for repositioning the thermal radiator after its initial deployment.

FIG. 9C is a table of representative thermal radiator positions at 6 hour increments for the satellite of FIGS. 6A-C when in geosynchronous orbit and for all four seasons.

DETAILED DESCRIPTION

Figure 1:
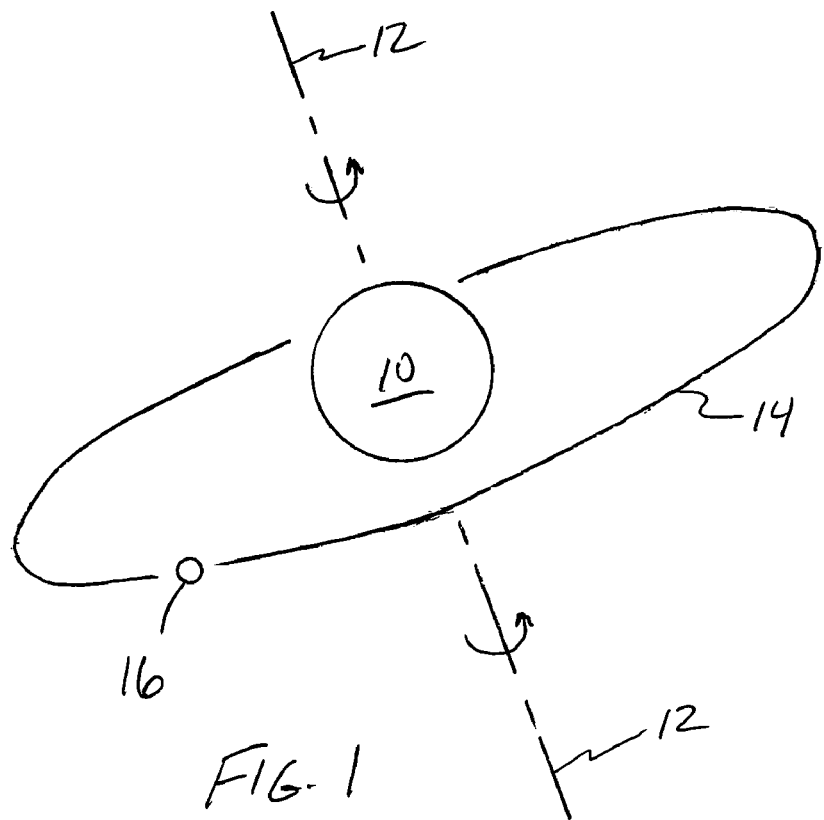
FIG. 1 is a schematic of a satellite orbiting Earth.

FIG. 1 illustrates a satellite 16 in one embodiment of an orbit 14. The orbit may be geosynchronous or any other appropriate orbit. The satellite 16 may be of any appropriate configuration, may provide any appropriate function (e.g., communications, weather imaging, Earth/other weather monitoring, astronomy), and may be of any appropriate type (e.g., three-axis stabilized; spinning). The satellite 16 in a geosynchronous orbit 14 would be at an altitude of about 35,800 kilometers or 22,300 miles above the surface of the Earth 10. In the illustrated embodiment, the satellite 16 is in a geostationary orbit (a subset of a geosynchronous orbit) in that the illustrated geosynchronous orbit 14 is within an orbital plane that also contains the equator of the Earth 10. Therefore, the geosynchronous orbit 14 is disposed about the polar or rotational axis 12 of the Earth 10, and the satellite 16 will appear to remain in a fixed or stationary position from the perspective of Earth 10 (e.g., to an observer on Earth 10).

Figure 3:
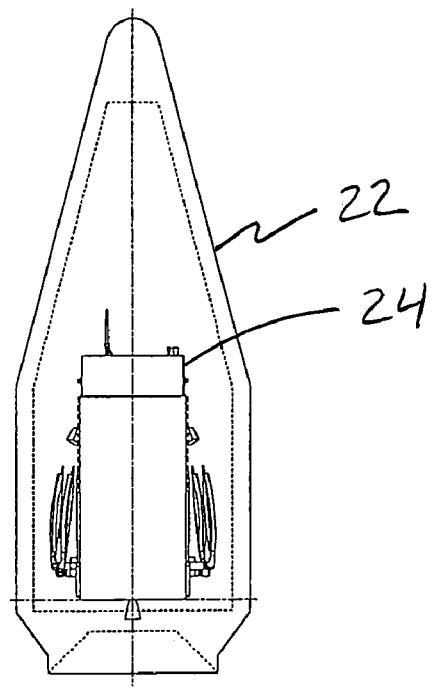
FIG. 3 is a cutaway view illustrating a schematic of a satellite in its stowed position within the payload fairing used with the launch vehicle in FIG. 2.
Figure 2:
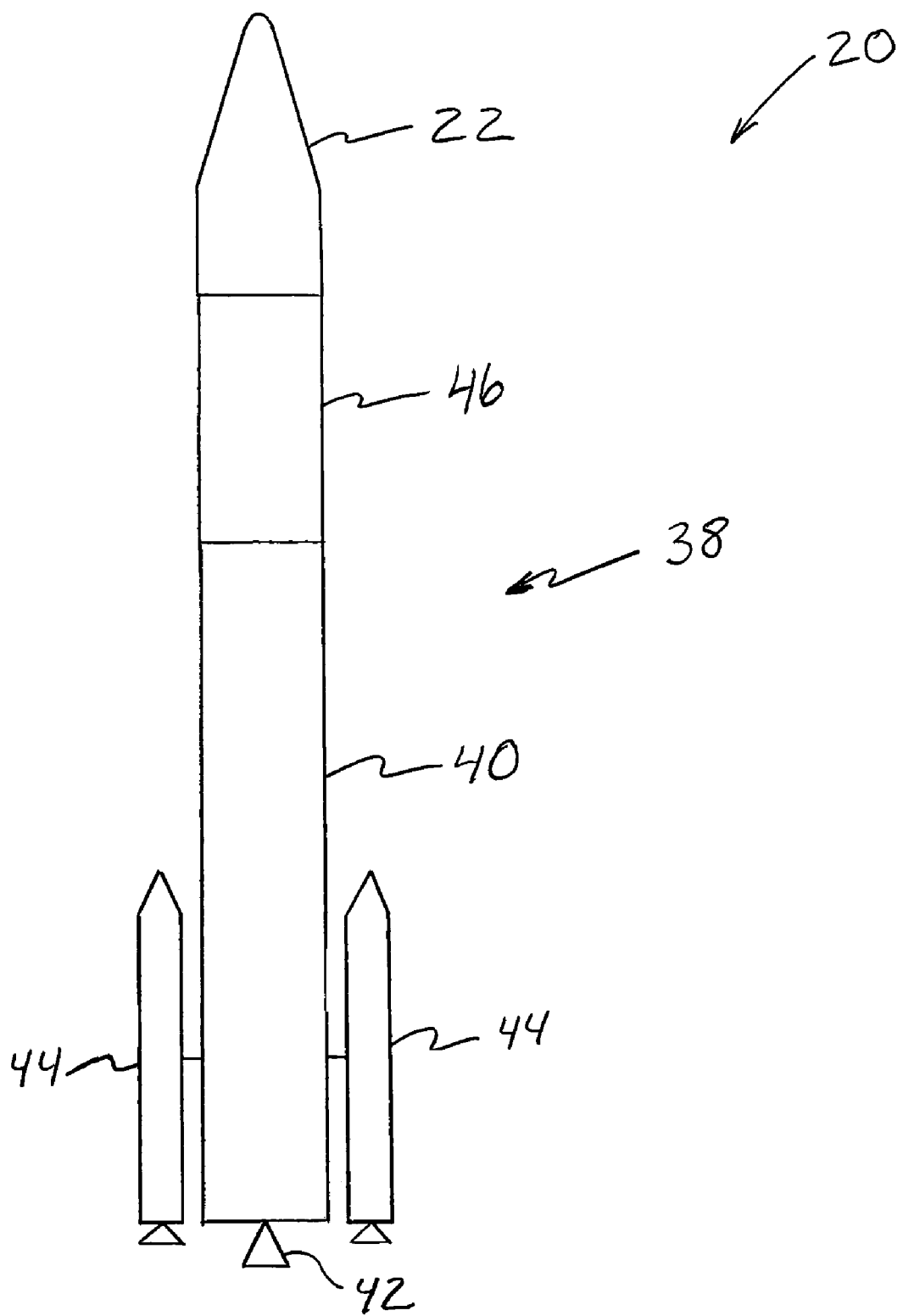
FIG. 2 is a schematic of a launch vehicle that may be used to transfer a satellite into an appropriate orbit.

FIG. 2 is a side view of what may be characterized as a spacecraft 20. The spacecraft 20 generally includes a launch vehicle 38 for transferring a payload (e.g., a satellite 24, as shown in FIG. 3) from Earth 10 into outer space. The launch vehicle 38 may be of any appropriate configuration for the associated payload. In the illustrated embodiment, the launch vehicle 38 includes a lower stage 40 having one or more appropriate engines or other propulsion sources (not shown) and one or more engine nozzles 42. One or more supplemental booster rockets, engines, or motors 44 of any appropriate type may be used by the lower stage 40 as well ("engines" typically being associated with a liquid fuel, and "motors" typically being associated with a solid fuel), if required/desired. The launch vehicle 38 further includes an upper stage 46, which may utilize one or more appropriate engines or other propulsion sources. Generally, the lower stage 40 transfers the payload from Earth 10 to a certain altitude and velocity relative to the surface of the Earth 10, where it is then jettisoned. Thereafter, the upper stage 46 continues to propel the satellite 24.

FIG. 3 illustrates at least certain details regarding a satellite 24 that is contained within the payload fairing 22 carried by the spacecraft 20 of FIG. 2. The satellite 16 in FIG. 1 may be in the form of the satellite 24 of FIG. 3. It should be appreciated that the payload fairing 22 may be of any appropriate size, shape, and/or configuration for its associated payload. Therefore, different configurations of the satellite 24 may require a different size, shape, and/or configuration for the payload fairing 22. The satellite 24 will be described with regard to being in a geosynchronous orbit 14 (and therefore hereafter will be referred to as a "geosynchronous satellite 24") and where the satellite 24 is maintained in an at least generally fixed orientation relative to Earth 10. However, the satellite 24 may be used for different orbits, need not be maintained in an at least generally fixed orientation relative to Earth 10 (e.g., the satellite 24 could spin while in orbit), or both.

Various components of the geosynchronous satellite 24 are maintained in a stowed position while within the payload fairing 22 (e.g., solar arrays, thermal radiators, antennas). Not all of the various components used by the geosynchronous satellite 24 are necessarily illustrated in FIG. 3. Once the lower stage 40 has been jettisoned from the upper stage 46, the propulsion source used by the upper stage 46 continues to propel the geosynchronous satellite 24. The geosynchronous satellite 24 will typically be jettisoned from the upper stage 46 prior to reaching a geosynchronous orbit 14. An appropriate propulsion source (e.g., one or more one-board propulsion sources) thereafter may be used to transfer the geosynchronous satellite 24 to a geosynchronous orbit 14. It should be appreciated that the payload fairing 22 may be jettisoned at any appropriate time during the transport of the geosynchronous satellite 24 to a geosynchronous orbit 14 (e.g., about 63 miles above Earth, but in any case typically prior to the time that the geosynchronous satellite 24 is jettisoned from the launch vehicle 38). In this regard, the payload fairing 22 is typically in the form of a plurality of structurally interconnected panels that may be separated in any appropriate manner (e.g., "exploding" bolts).

Figures 4A, 4B:
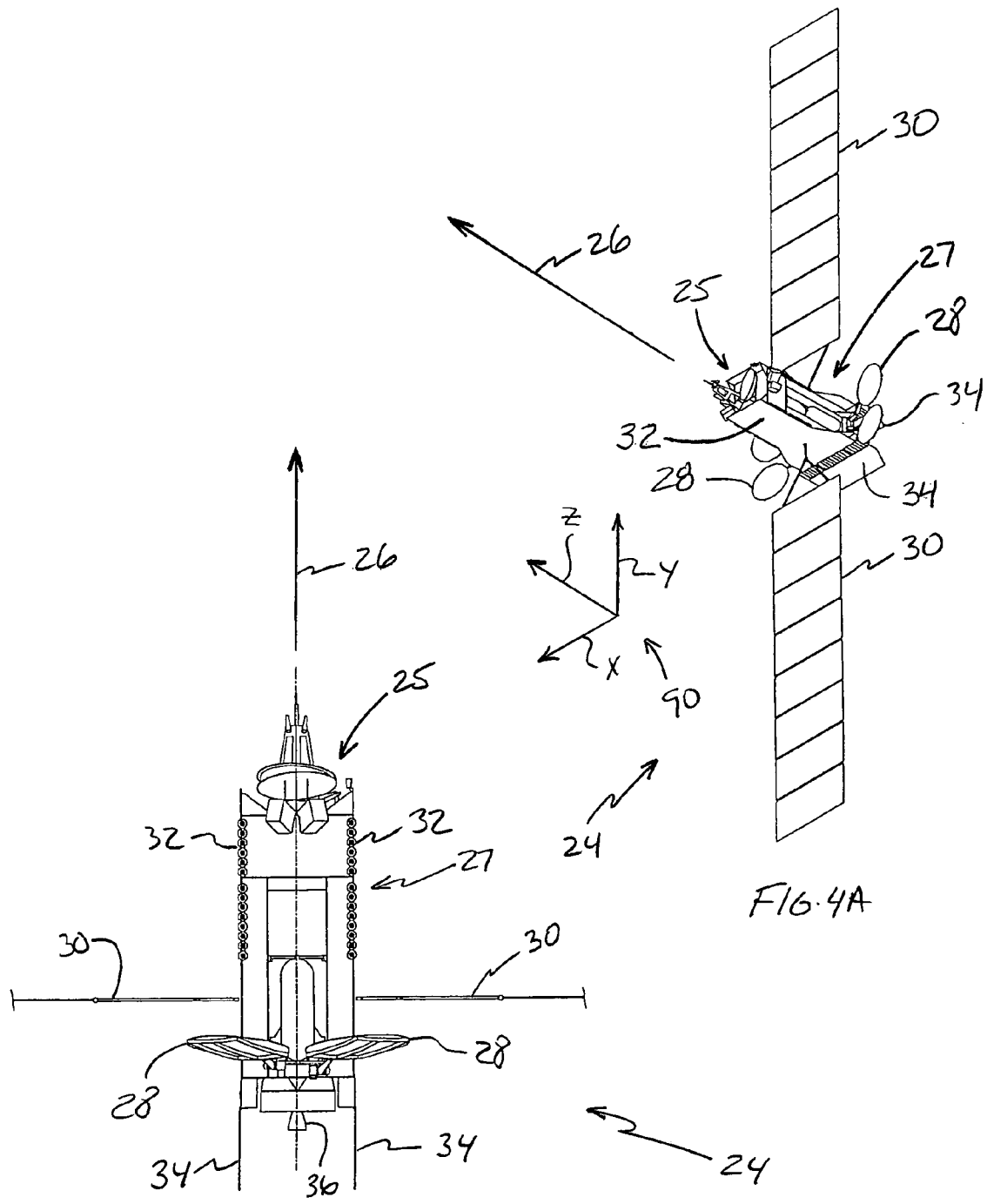
FIG. 4A is a perspective view of the satellite of FIG. 3 with its various components in their respective deployed positions and during orbit.
FIG. 4B is a side view of the satellite of FIG. 4A.
Figure 5B:
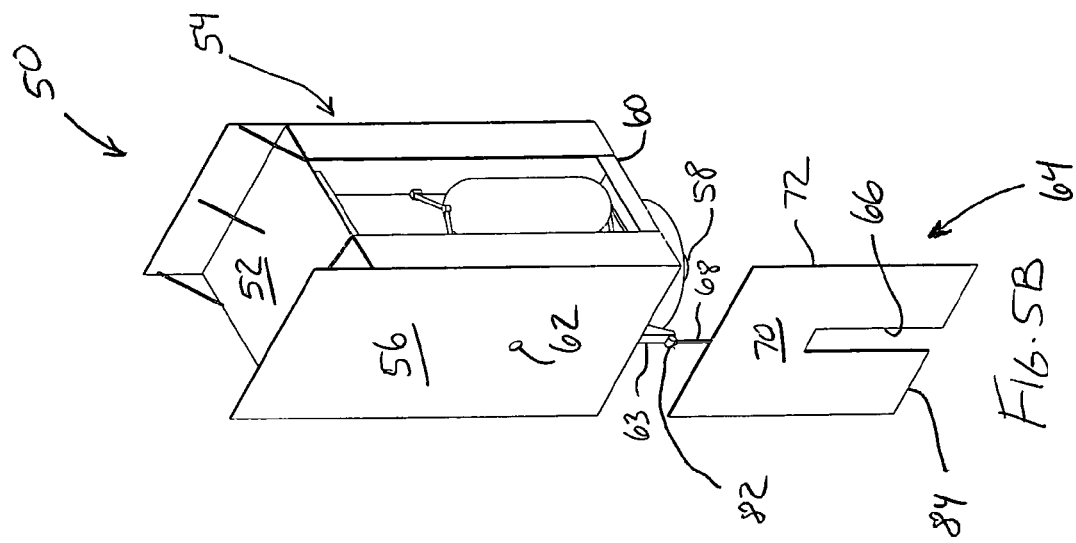
FIG. 5B is a perspective view of the satellite of FIG. 5A with the thermal radiator in a first deployed position.
Figure 5A:
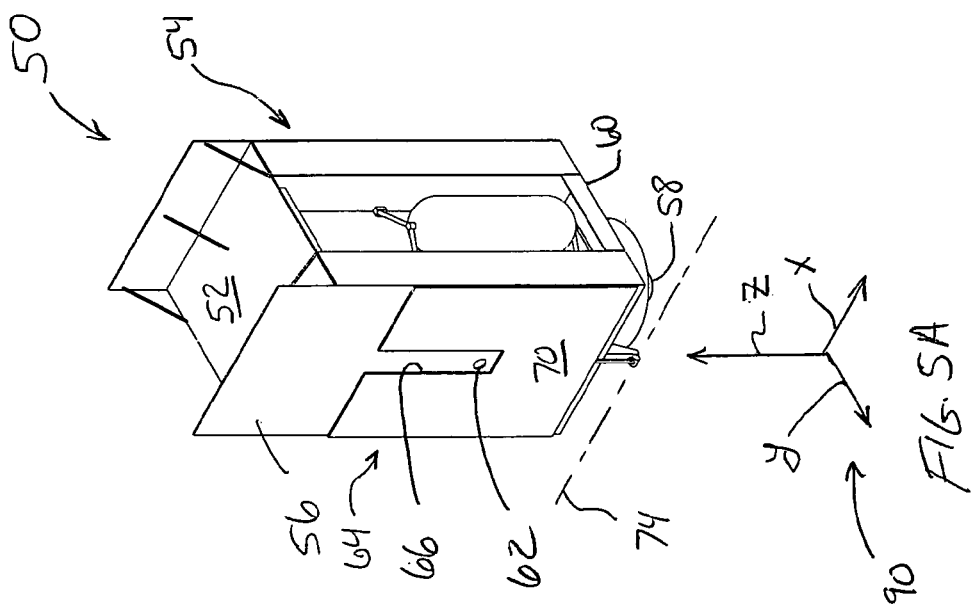
FIG. 5A is a perspective schematic of a satellite with a deployable, articulatable thermal radiator in its stowed position.

Various components of the geosynchronous satellite 24 may be deployed at the appropriate time, for instance once the geosynchronous satellite 24 is in the desired geosynchronous orbit 14. FIGS. 4A-B illustrate views of the geosynchronous satellite 24 with at least certain of its components having been deployed relative to its body 27. Representative deployable components used by the geosynchronous satellite 24 include antennas 28, solar arrays 30, and thermal radiators 34. The geosynchronous satellite 24 may also utilize various components that are maintained in a stationary or fixed position, such as fixed thermal radiators 32 and an appropriate propulsion source or thruster 36.

The geosynchronous satellite 24 flies in a certain orientation when in a geosynchronous orbit 14 as noted (e.g., being of a three-axis stabilized type). What may be characterized as a nadir panel or end 25 of the geosynchronous satellite 24 always faces or projects toward Earth 10 when the geosynchronous satellite 24 is in its geosynchronous orbit 14 (corresponding with the direction of arrow 26, and corresponding with the "z" dimension for the illustrated coordinate system 90). The deployable thermal radiators 34 extend from an opposite end of the geosynchronous satellite 24 in an anti-nadir direction when the satellite 24 is in its geosynchronous orbit 14. Stated another way, the body 27 of the geosynchronous satellite 24 is disposed at a lower altitude from Earth 10 than the deployed thermal radiators 34 (e.g., the body 27 of the satellite 24 is always disposed between the deployed thermal radiators 34 and Earth 10 when the satellite 24 is in its geosynchronous orbit 14). With further regard to the orientation of the geosynchronous satellite 24 during flight, the solar arrays 30 in the illustrated embodiment would be disposed perpendicularly to the orbital plane (the orbital plane being in the "x" and "z" dimensions for the illustrated coordinate system 90) in their deployed configuration (the solar arrays 30 extend in the "y" dimension for the illustrated coordinate system 90). Stated another way, the fixed thermal radiator 32 would typically be disposed parallel to the orbital plane during flight in the geosynchronous orbit 14.

The thermal radiators 34 are originally stowed on their corresponding fixed thermal radiator 32, including while the geosynchronous satellite 24 is contained within the payload fairing 22 of the spacecraft 20. The thermal radiators 34 may remain in a stowed position after the payload fairing 22 has been jettisoned and until deployment is desired/required (e.g., upon reaching the desired orbit 14). Both thermal radiators 34 may be deployed into a first deployed position by pivoting at least generally about a pivot axis that is parallel with the "x" dimension for the illustrated coordinate system 90. Typically this would be where the deployable thermal radiators 34 are at least substantially (e.g., close to) coplanar or parallel with their corresponding fixed thermal radiator 32. However, other first deployed positions could be utilized as well. The first deployed position may be the same for each thermal radiator 34, although such is not required (the thermal radiators 34 could be mirror images in their respective first deployed positions, although such is not required). Thereafter and for any relevant purpose, the deployed thermal radiators 34 may be repositioned or moved from the first deployed position to a second deployed position by pivoting at least generally about the noted pivot axis. The first thermal radiator 34 may be repositioned on multiple occasions after the initial deployment (e.g., from any deployed position to another deployed position).

Any type of motion or combination of motions may be used to move the thermal radiators 34 from their stowed position to their first deployed position (e.g., movement within a single dimension as described; movement within multiple dimensions, including sequential movement in multiple dimensions, simultaneous movement in multiple dimensions, or both; pivoting about one axis; pivoting about multiple axes; translation/linear movement; or any combination thereof). Any type of motion may be used to move the first thermal radiators 34 from one deployed position to another deployed position as well. However, in the illustrated embodiment the thermal radiators 34 each move in a single dimension in progressing from their respective stowed position to their respective first deployed position. Furthermore, the thermal radiators 34 each move in a single dimension in progressing from one deployed position to another deployed position.

Another embodiment of a satellite is illustrated in FIGS. 5A-D and is identified by reference numeral 50. The satellite 16 in FIG. 1 may be in the form of the satellite 50 of FIGS. 5A-D. The satellite 50 will be described with regard to being in a geosynchronous orbit 14 (and therefore hereafter will be referred to as a "geosynchronous satellite 50") and where the satellite 50 is maintained in an at least generally fixed orientation relative to Earth 10. However, the satellite 50 may be used for different orbits, need not be maintained in an at least generally fixed orientation relative to Earth 10 (e.g., the satellite 50 could spin while in orbit), or both.

The geosynchronous satellite 50 generally includes a body 54 having a nadir panel or end 52. This nadir end 52 always faces or projects toward Earth 10 when the satellite 50 is in a geosynchronous orbit 14 and with the satellite 50 being of the three-axis stabilized type. The body 54 of the satellite 50 also includes what may be characterized as an anti-nadir panel or end 60. The nadir end 52 and the anti-nadir end 60 are oppositely disposed on the body 54. Therefore, the anti-nadir end 60 always faces or projects away from Earth 10 when the satellite 50 is in a geosynchronous orbit 14 and when the satellite 50 is of the three-axis stabilized type. A thruster 58 is disposed on the anti-nadir end 60, although it could be disposed at any appropriate location on the satellite 50. This thruster 58 may be used to transfer the satellite 50 from the location in space where the satellite 50 is jettisoned from the upper stage 46 of the launch vehicle 38, and then to its desired geosynchronous orbit 14 (e.g., for propulsion). The thruster 58 may also be used to maintain the geosynchronous satellite 50 in its desired geosynchronous orbit 14 (e.g., for stationkeeping orbit maintenance).

A pair of fixed thermal radiators 56 may be disposed on opposite sides of the body 54 of the geosynchronous satellite 50. Each fixed thermal radiator 56 is at least generally contained within a reference plane containing the "x" and "z" dimensions for the illustrated coordinate system 90. Stated another way, the primary surface of each fixed thermal radiator 56 is disposed at least generally perpendicular to the "y" dimension for the illustrated coordinate system 90. The satellite 50 may fly in an orientation such that its fixed thermal radiators 56 face or projects toward deep space when the geosynchronous satellite 50 is in its geosynchronous orbit 14 (e.g., so that the sun's rays are parallel to the primary radiating surface of the fixed thermal radiators 56, or such that the angle therebetween is minimized).

A solar array attachment locale 62 exists in relation to each fixed thermal radiator 56 to accommodate solar arrays of the type illustrated in FIGS. 4A-B. For instance, one of the solar arrays 30 from the satellite 24 of FIG. 4A could extend in the "y" dimension from the attachment locale 62 of one of the fixed thermal radiators 56, while the other of the solar arrays 30 from the satellite 24 of FIG. 4A could extend in the "y" dimension from the attachment locale 62 of the other fixed thermal radiator 56. That is, the "fixed end" of any such solar array and the "free end" of such a solar array would be spaced in the "y" dimension (the distance between the fixed and free ends defining the length dimension for the solar array, and this length dimension coinciding with the "y" dimension for the illustrated coordinate system 90).

The geosynchronous satellite 50 of FIGS. 5A-D further includes at least one deployable thermal radiator 64. A single deployable thermal radiator 64 is used by the illustrated embodiment. Another deployable thermal radiator 64 could be disposed on the opposite side of the body 54 so as to be the mirror image of the illustrated deployable thermal radiator 64 (not shown). One or more deployable thermal radiators 64 could be used at any other appropriate location as well. Generally, at least one deployable thermal radiator 64 with the position control to be described herein is used by the geosynchronous satellite 50. Although this deployable thermal radiator 64 could be disposed in any appropriate position relative to the body 54 of the geosynchronous satellite 50 when deployed, FIGS. 5A-D illustrate one preferred arrangement for the deployable thermal radiator 64. The deployable thermal radiator 64 may be characterized as a cantilevered structure having a fixed end 82 and a free end 84. Generally, the noted preferred arrangement is where the fixed end 82 and the free end 84 are spaced in the "z" dimension, and with the free end 84 being further from Earth 10 than the fixed end 82 when the thermal radiator 64 is in its deployed position.

A stationary mount 63 is attached to the body 54 of the geosynchronous satellite 50. The mount 63 is located on the anti-nadir end 60, and extends from the body 54 of the geosynchronous satellite 50 in an anti-nadir direction (a fixed end and a free end of the mount 63 being spaced in the "z" dimension). Stated another way, the mount 63 is in the form of a cantilever, where it's fixed end is disposed at a lower elevation relative to Earth 10 than it's free end when the geosynchronous satellite 50 is in its geosynchronous orbit 14.

A deployment arm 68 of the deployable thermal radiator 64 is movably interconnected with the above-noted mount 63. The deployable thermal radiator 64 includes a pair of oppositely disposed primary radiating surfaces 70 for rejecting heat. A notch 66 is included in the deployable thermal radiator 64 to accommodate stowage of the deployable thermal radiator 64 on the corresponding fixed thermal radiator 56, and to further accommodate the attachment of a solar array (e.g. solar array 30) at the illustrated attachment locale 62. In the illustrated embodiment, the length of the deployable thermal radiator 64 in its stowed position (corresponding with the "z" dimension for the illustrated coordinate system 90) is less than the length of its corresponding fixed thermal radiator 54. Other sizes, shapes, and/or configurations may be appropriate for the deployable thermal radiator 64.

The geosynchronous satellite 50 flies in a certain orientation when in its geosynchronous orbit 14. The nadir panel or end 52 of the geosynchronous satellite 50 always faces or projects toward Earth 10 when the geosynchronous satellite 50 is in its geosynchronous orbit 14 as previously noted (corresponding with the "z" dimension for the illustrated coordinate system 90). The deployed thermal radiator 64 extends from the anti-nadir end 60 of the geosynchronous satellite 50 and in an anti-nadir direction when the satellite 50 is in its geosynchronous orbit 14, or more generally its fixed end 82 and free end 84 are spaced in the "z" dimension, with the free end 84 being further from Earth 10 than the fixed end 82. Stated another way, the body 54 of the geosynchronous satellite 50 is disposed at a lower altitude relative to Earth 10 than the primary radiating surfaces 70 of the deployed thermal radiator 64 (e.g., the body 54 of the satellite 50 is always disposed somewhere between the primary radiating surfaces 70 of the deployed thermal radiator 64 and Earth 10 in the "z" dimension when the satellite 50 is in its geosynchronous orbit 14). Although the primary radiating surfaces 70 of the deployed thermal radiator 64 and the body 54 of the geosynchronous satellite 50 occupy at least generally the same position in the "x" dimension in the illustrated embodiment, an offsetting of these components in the "x" dimension could be utilized as well if desired/required (not shown). With further regard to the orientation of the geosynchronous satellite 50 during flight, any solar array that extends from the attachment locale 62 in the illustrated embodiment would typically be disposed perpendicularly to the orbital plane (the orbital plane containing the "x" and "z" dimensions for the illustrated coordinate system 90) in its deployed configuration (the solar array would extend in the "y" dimension for the illustrated coordinate system 90). Stated another way, the fixed thermal radiators 56 would typically be disposed parallel to the orbital plane during flight, or so as to face or project toward deep space with the geosynchronous satellite 50 being in its geosynchronous orbit 14. The deployable thermal radiator 64 is stowed on its corresponding fixed thermal radiator 56 while the geosynchronous satellite 50 is within the payload fairing 22 of the spacecraft 20, as well as possibly for some time after the fairing 22 is jettisoned. The thermal radiator 64 may be deployed into a first deployed position by pivoting at least generally about a first axis 74 that is parallel with the "x" dimension for the illustrated coordinate system 90. Typically this would be to where the primary radiating surfaces 70 of the deployable thermal radiator 64 are at least generally coplanar or parallel with the orbital plane of the satellite 50 when in its geosynchronous orbit 14 (e.g., FIG. 5B, where each primary radiating surface 70 is contained within a reference plane defined by the "x" and "z" dimensions for the illustrated coordinate system 90, and where each such primary radiating surface 70 faces or projects toward deep space). However, other first deployed positions could be utilized as well. Thereafter and for any relevant purpose, the deployed thermal radiator 64 may be repositioned or moved from one deployed position to another deployed position.

The orientation or position of the deployable thermal radiator 64 may be changed in two different dimensions any time after the thermal radiator 64 has assumed its first deployed position. The deployable thermal radiator 64 may be moved about the first axis 74 to reposition the deployable thermal radiator 64 from one deployed position to another deployed position. One representative repositioning in this regard is illustrated by comparing FIGS. 5B (a representative first deployed position, and 5C (a representative second deployed position). Another option is for the deployable thermal radiator 64 to be moved about a second axis 76 to reposition the deployable thermal radiator 64 from one deployed position to another deployed position. One representative repositioning in this regard is illustrated by comparing FIGS. 5B (a representative first deployed position) and 5D (a representative second deployed position). In the illustrated embodiment, the second axis 76 is collinear or parallel with the "z" for the illustrated coordinate system 90. It should be appreciated that the deployable thermal radiator 64 could be moved about both the first axis 74 and the second axis 76 to reposition the deployable thermal radiator 64 from one deployed position to another deployed position. It should also be appreciated that the above-noted repositioning of the deployed thermal radiator 64 may be from any deployed position to another deployed position. That is, the repositioning described herein is not limited to only changing a thermal radiator 64 from its initially deployed position to another deployed position. Moreover, the deployable and thereafter adjustable thermal radiator 64 may be used by the satellite 50 when in orbits other than geosynchronous, when the satellite 50 is not maintained in an at least generally fixed orientation relative to Earth 10 (e.g., the satellite 50 could spin while in orbit), or both.

Figure 6A:
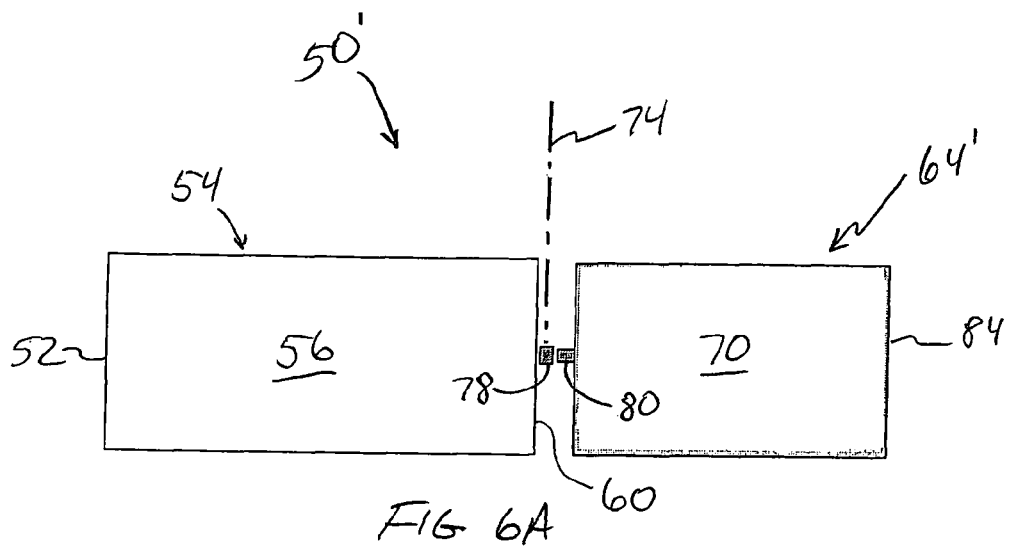
FIG. 6A is a top view of a variation of the satellite of FIG. 5A, with its thermal radiator being in its initially deployed position.
Figure 6B:
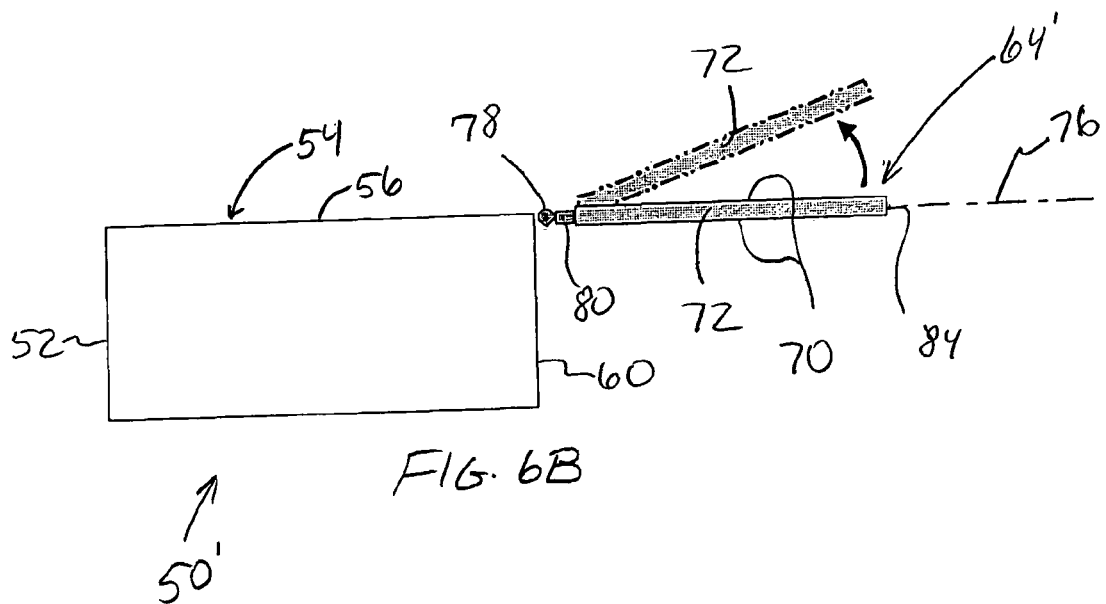
FIG. 6B is a side view of the satellite of FIG. 6A, illustrating a first range of motion for repositioning the thermal panel after its initial deployment.
Figure 6C:
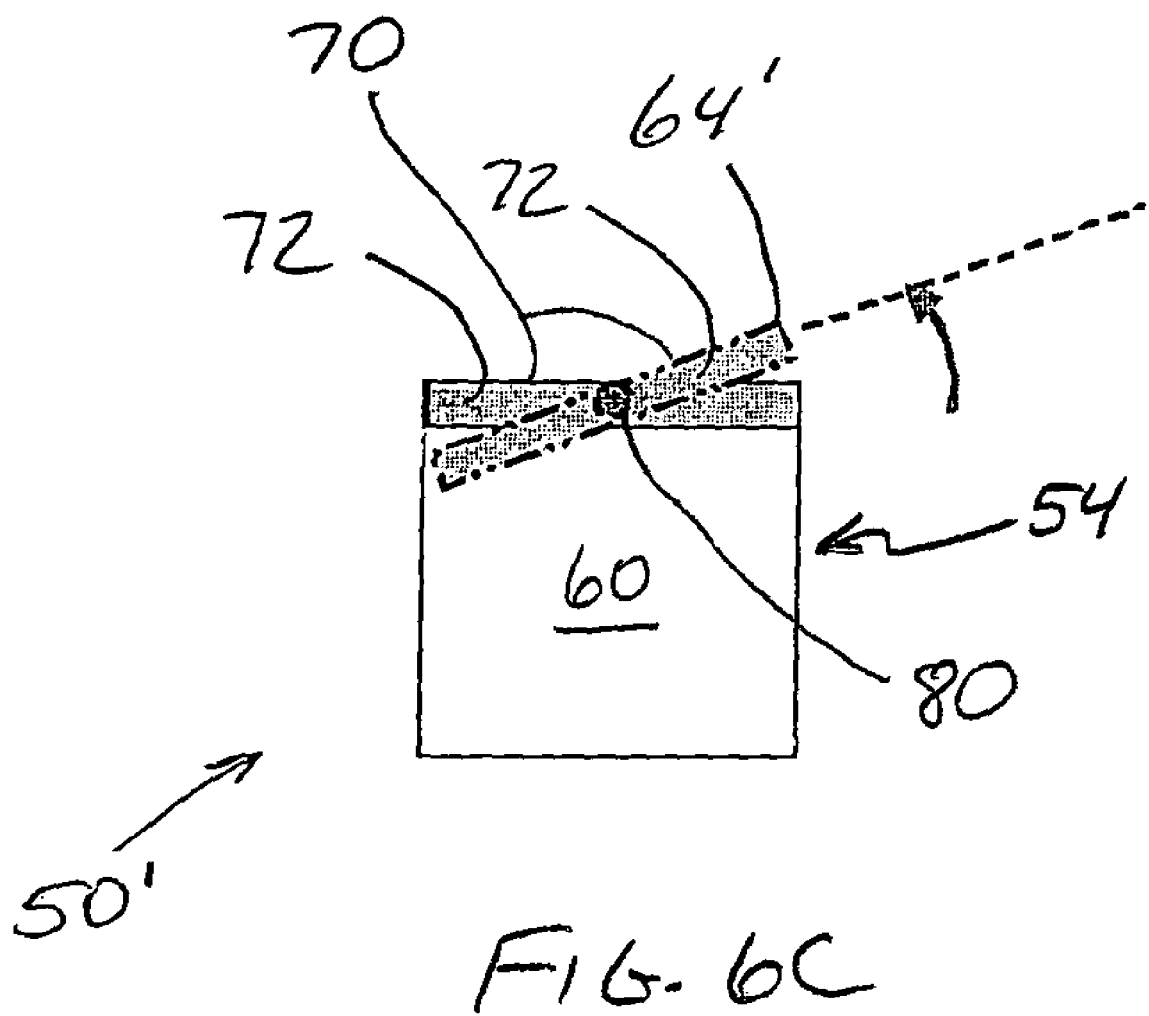
FIG. 6C is an end view of the satellite of FIG. 6A, illustrating a second range of motion for repositioning the thermal panel after its initial deployment.

FIGS. 6A-C illustrate a variation of the satellite 50 of FIGS. 5A-D, and which is identified by reference numeral 50'. Common components are identified by the same reference numeral. Those components that differ in some respect are identified by a "single prime" designation. In this regard, the deployable thermal radiator 64' does not include the notch 66, although such could be the case. All aspects of the deployable thermal radiator 64 discussed above are equally applicable to the deployable thermal radiator 64'. The satellite 50' may be placed in any appropriate orbit, may be maintained in fixed orientation to Earth 10 (e.g., of a three-axis stabilized type) or otherwise (e.g., the satellite 50' could spin during orbit), or both.

Principally, the satellite 50' illustrates one way of providing the motion for the deployed thermal radiator repositioning described above in relation to the satellite 50. In this regard, the satellite 50' uses a first gimbal 78 and a second gimbal 80. The first gimbal 78 allows the deployable thermal radiator 64' to move about the first axis 74. FIG. 6B illustrates one representative movement in this regard. Generally, the first gimbal 78 allows the deployable thermal radiator 64' to move only in a first dimension. The first gimbal 78 is used to move the thermal radiator 64' from its stowed position to its first deployed position. The first gimbal 78 may also be used to reposition the thermal radiator 64' after its initial deployment.

The second gimbal 80 in the case of the satellite 50' allows the deployable thermal radiator 64' to move about the second axis 76. Unlike the first gimbal 78, the second gimbal 80 alone can't be used to deploy the thermal radiator 64' from its stowed position (i.e., the thermal radiator 64' cannot be moved from the stowed position to a deployed position using only a movement provided by the second gimbal 80). FIG. 6C illustrates one representative movement associated with the second gimbal 80. Generally, the second gimbal 80 allows the deployable thermal radiator 64' to move only in a second dimension which is different than the first dimension. In the illustrated embodiment, the first and second dimensions are orthogonal to each other. In any case, the deployed thermal radiator 64' may be repositioned in two distinct dimensions in the case of the satellite 50'. Any structure that allows for repositioning of the deployed thermal radiator 64' in at least two distinct dimensions may be utilized.

FIGS. 7A-D also illustrate a variation of the satellite 50 of FIGS. 5A-D, and which is identified by reference numeral 50". Common components are identified by the same reference numeral. Those components that differ in some respect are identified by a "double prime" designation. The satellite 50" will be described with regard to being in a geosynchronous orbit 14 (and therefore hereafter will be referred to as a geosynchronous satellite 50") and where the satellite 50" is maintained in an at least generally fixed orientation relative to Earth 10. However, the satellite 50" may be used for different orbits, need not be maintained in an at least generally fixed orientation relative to Earth 10 (e.g., the satellite 50" could spin while in orbit), or both.

The geosynchronous satellite 50" illustrates using a pair of deployable thermal radiators 64" on a common side of the satellite 50". Another such pair of deployable thermal radiators 64" could be disposed on the opposite side of the satellite 50" as well. Another distinction between the geosynchronous satellite 50 of FIGS. 5A-D and the geosynchronous satellite 50" of FIGS. 7A-D relates to the general deployed position of the thermal radiators 64". Here, one deployed thermal radiator 64" extends from the body 54 in the direction that the geosynchronous satellite 50" travels in its geosynchronous orbit 14, while the other deployed thermal radiator 64" extends from the body 54 in the opposite direction. Another way to characterize the deployed position of the thermal radiators 64" is that one of the thermal radiators 64" is disposed on a leading side of the body 54 in relation to the direction that the geosynchronous satellite 50" travels in its geosynchronous orbit 14, while the other deployed thermal radiator 64" is on a trailing side of the body 54 in relation to the direction that the geosynchronous satellite 50" travels in its geosynchronous orbit 14. Yet another way to characterize the deployed position of the thermal radiator 64" is that the fixed end 82 of each radiator 64" is spaced from the oppositely disposed and corresponding free end 84 in the "x" dimension, versus in the "z" dimension as discussed above with regard to the satellite 50 of FIGS. 5A-D.

The deployment and repositioning of the thermal radiators 64" in the case of the geosynchronous satellite 50" of FIGS. 7A-D may also be described in relation to a first axis 74" and a second axis 76" relative to the illustrated coordinate system 90. Although the radiators 64" may move from the stowed position (FIG. 7A) to a first deployed position (e.g., FIG. 7B) by moving at least generally about the first axis 74", here the first axis 74" coincides with the "z" dimension (versus the "x" dimension in the case of the geosynchronous satellite 50 of FIGS. 5A-D). Moreover, although the radiators 64" may move from one deployed position (e.g., FIG. 7B or 7C) to another deployed position (e.g., FIG. 7D) by moving at least generally about the second axis 76", here the second axis 76" coincides with the "x" dimension (versus the "z" dimension in the case of the geosynchronous satellite 50 of FIGS. 5A-D).

The orientation of each deployable thermal radiator 64" may be changed in two different dimensions any time after the thermal radiator 64" has assumed its first deployed position, and where it is then stationary relative to the body 54 of the geosynchronous satellite 50". Each deployable thermal radiator 64" may be moved about the corresponding first axis 74" to reposition the deployable thermal radiator 64" from one deployed position to another deployed position. One representative repositioning in this regard is illustrated by comparing FIGS. 7B (a representative first deployed position) and 7C (a representative second deployed position). Another option is for the deployable thermal radiators 64" to be moved about a corresponding second axis 76" to reposition the deployable thermal radiators 64" from one deployed position to another deployed position. One representative repositioning in this regard is illustrated by comparing FIGS. 7B (a representative first deployed position) and 7D (a representative second deployed position). It should be appreciated that the deployable thermal radiators 64" could be moved about both the first axis 74" and the second axis 76" to reposition any deployable thermal radiator 64" from one deployed position to another deployed position. It should also be appreciated that the above-noted repositioning of a deployed thermal radiator 64" may be from any deployed position, to another deployed position. That is, the repositioning described herein is not limited to only changing a thermal radiator 64" from its initially deployed position to another deployed position. Moreover, the deployable and thereafter adjustable thermal radiators 64" may be used by the satellite 50" when in orbits other than geosynchronous, when the satellite 50" is not maintained in an at least generally fixed orientation relative to Earth 10 (e.g., the satellite 50" could spin while in orbit), or both.

Figure 8:
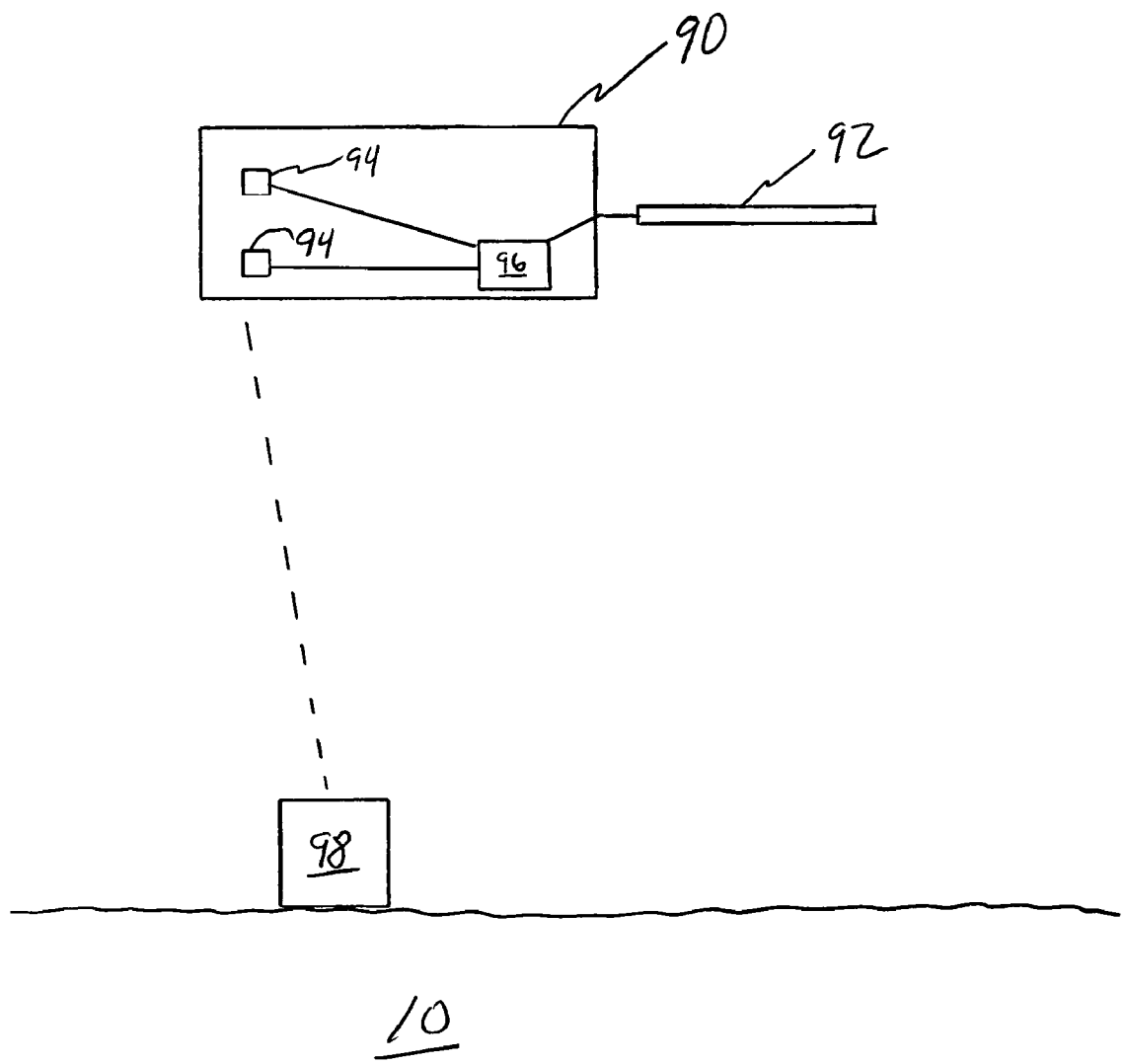
FIG. 8 is a schematic of a satellite with a deployable, and thereafter repositionable, thermal radiator, and illustrating representative bases for controlling the repositioning of this thermal radiator.

The satellite 24 of FIGS. 4A-B, the satellite 50 of FIGS. 5A-D, the satellite 50' of FIGS. 6A-C, and the satellite 50" of FIGS. 7A-D, each having at least one thermal radiator that is both deployable, and thereafter repositionable, may control any such thermal radiator in any appropriate manner. Representative control implementations for the deployable, repositionable thermal radiators of the satellites 24, 50, 50' and 50" will be described with regard to FIG. 8. FIG. 8 is a schematic representation of a satellite 90 having at least one deployable and thereafter repositionable thermal radiator 92. In one embodiment, the thermal radiator 92 will move from its stowed position to its original or initial deployed position. This original deployment may be initiated in any appropriate manner, and the original deployed position of the thermal radiator 92 may be established/controlled in any appropriate manner. For instance, the original deployed position of the thermal radiator 92 may be pre-established, such as by being "programmed" into a controller 96 that is operatively interconnected with the thermal radiator 92. The thermal radiator 92 may thereafter be repositioned in any appropriate manner. For instance, repositioning of the thermal radiator 92 may be controlled through a ground station 98 that is communicating with the satellite 90 during orbit (e.g., a "manual" repositioning). Another option would be for a repositioning sequence to be stored on or accessed by the controller 96 so as to reposition the thermal radiator 92 in a predetermined manner (e.g., the controller 96 may be "programmed" to move the thermal radiator 92 in a predetermined manner during the mission). For instance, this repositioning sequence may run the thermal radiator 92 through a set of positions based upon predetermined knowledge of the satellite's 90 position relative to the Earth and/or Sun during/throughout its mission. Yet another option would be to provide for closed loop control of the position of the thermal radiator 92 after its initial deployment. For instance, the thermal radiator 92 could be repositioned based upon information provided by one or more sensors 94 (e.g., temperature sensors, power sensors) that are operatively interconnected with the controller 96. Such a closed loop system may use any appropriate algorithm to reposition the thermal radiator 92 to achieve any desired result.

There are a number of benefits associated with the deployable, articulatable thermal radiators used by the satellites described herein. The primary benefit is of course to be able to reposition a thermal radiator at some point in time after its initial deployment, for any appropriate purpose, and on any appropriate basis. That is, the thermal radiators described herein are deployable (movable from a stowed position or a position in which the thermal radiator is in during at least the initial portion of the flight from Earth, to another position (a first deployed position)), and are thereafter adjustable. The deployment and subsequent repositioning of the thermal radiators described herein are subject to a number of characterizations. One is that a particular thermal radiator may be in a non-operational state when it moves from its stowed position to a first deployed position (e.g., no coolant flowing through the thermal radiator), operation of the now deployed thermal radiator may be initiated once in a first deployed position (e.g., coolant may begin flowing through the thermal radiator), and the thermal radiator may continue to be operated as it is moved from one deployed position to another deployed position as well as during any further repositionings (e.g., coolant may be flowing through the thermal radiator while/as it is being repositioned). Another characterization is that a change in position of a particular thermal radiator in moving from its stowed position to its first deployed position may be of a first magnitude (e.g., by traveling through a range of motion of greater than about 90°), and that a change in position of this thermal radiator in moving from one deployed position to another deployed position may be of a second magnitude that is less than the first magnitude (e.g., by traveling through a range of motion of no more than about 90°, and possibly through a range of motion of only a few degrees). Finally, the thermal radiators described herein may be in a stationary position relative to a body of the satellite after reaching the desired deployed position (e.g., the motion of a particular thermal radiator may be terminated after reaching its first deployed position, and the motion of this thermal radiator may be terminated after reaching any subsequent deployed position after being repositioned as desired/required).

The repositioning of the deployable thermal radiators described herein after their initial deployment may be undertaken for any appropriate purpose and at any appropriate time. For instance, the repositioning may be to maintain a particular deployed thermal radiator "on edge" with the sun or to reduce the angle of incidence of the sun's rays on the thermal radiating surface(s) of the deployed thermal radiator. The deployed thermal radiator could undergo a repositioning on a seasonal basis, on a daily basis, on any desired/required schedule, or as otherwise desired/required. The repositioning may also be for purposes of adjusting the amount of heat that is being rejected by the deployed thermal radiator. Yet another possibility is that the repositioning may be for purposes of increasing the exposure of the thermal radiating surface(s) of the deployed thermal radiator to the sun's rays (e.g., to "thaw out" the deployed thermal radiator).

Figure 9A:
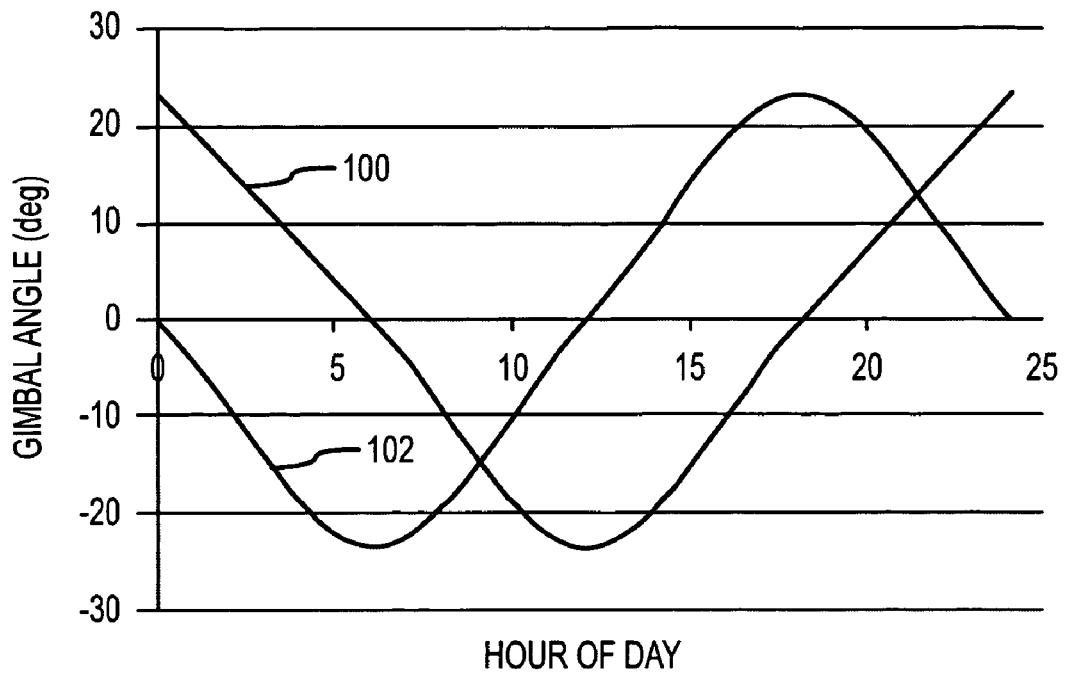
FIG. 9A graphically illustrates representative thermal radiator positions for the satellite of FIGS. 6A-C when in geosynchronous orbit and for the June Solstice.
Figure 9B:
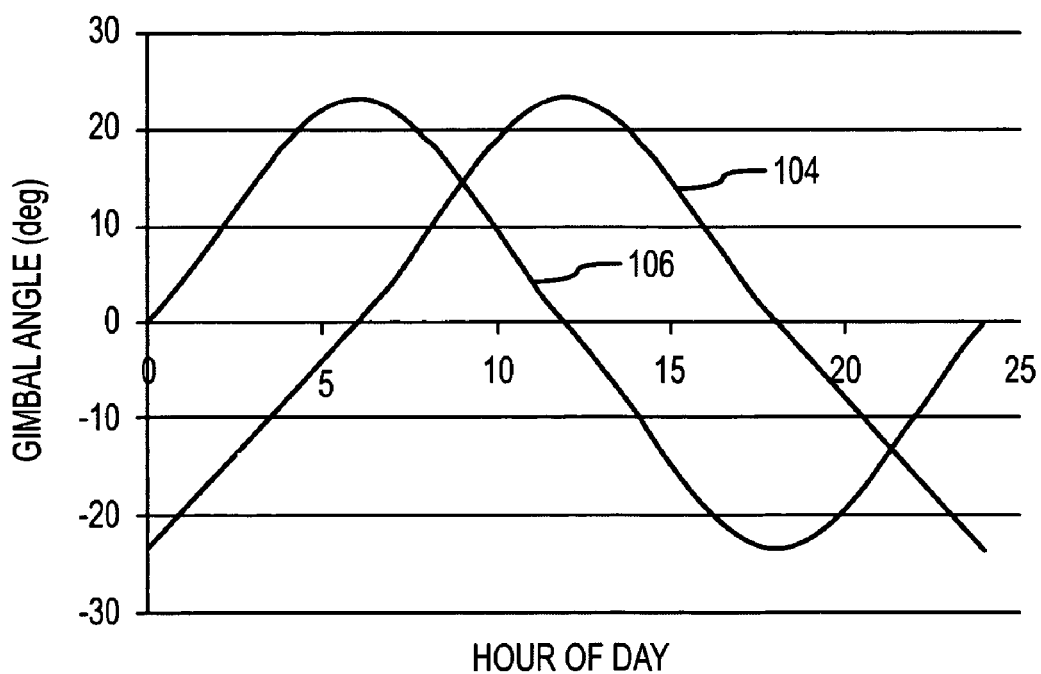
FIG. 9B graphically illustrates representative thermal radiator positions for the satellite of FIGS. 6A-C when in geosynchronous orbit and for the December Solstice.

By repositioning the various deployed radiators described herein, the solar thermal load may be nearly eliminated from the deployed thermal radiator panel. Assuming typical thermal radiator panel optical properties of about 0.21 absorptivity and about 0.79 emissivity, and that the surface finish would be modified such that the emissivity increased to about 0.92, about a 50% increase in thermal capacity per unit area is theoretically achievable. Consider the case of the satellite 50' of FIGS. 6A-C, where the same is in a particular geosynchronous orbit, where the nadir panel 52 always faces Earth 10, and where the deployed thermal radiator 64 extends from the body 56 of the satellite 50' in the anti-nadir direction. FIGS. 9A-C each present thermal radiator position data for this scenario. More specifically, FIGS. 9A-B graphically illustrate the various positions of the thermal radiator 64' for the June Solstice and the December Solstice, respectively, again where the objective is to minimize the solar thermal load on the thermal radiator 64' for a particular geosynchronous orbit. In FIG. 9A, curve 100 corresponds with the angles for the first gimbal 78 and relative to the first axis 74, while curve 102 corresponds with the angles for the second gimbal 80 and relative to the second axis 76. Similarly, in FIG. 9B, curve 104 corresponds with the angles for the first gimbal 78 and relative to the first axis 74, while curve 106 corresponds with the angles for the second gimbal 80 and relative to the second axis 76. FIG. 9C presents tabulated data of the position of the thermal radiator 64' at various different times of the day (6 hour increments being shown) for all four seasons.

In summary, the deployable, and thereafter adjustable, thermal radiators herein may be used with any appropriate satellite and in any appropriate orbit. However, in one embodiment at least one of these deployable, and thereafter repositionable radiators is used by a satellite in a geosynchronous orbit, and where this satellite is at least substantially maintained in a fixed orientation relative to the Earth.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A satellite, comprising:
   a body;
   an attachment locale positioned on said body, wherein said attachment locale is configured to accommodate an attachment of a solar array;
   a first thermal radiator, wherein said first thermal radiator is deployable from a stowed position to a first deployed position, wherein said first thermal radiator further is articulatable after said first thermal radiator is in said first deployed position to move said first thermal radiator from said first deployed position to at least a second deployed position, wherein said first thermal radiator includes a notch formed in a distal portion of said first thermal radiator, and wherein said notch is configured to accommodate the attachment of said solar array at said attachment locale when said first thermal radiator is in said stowed position; and
   a controller operatively interconnected with said first thermal radiator, wherein said controller is programmed to reposition said first thermal radiator from said first deployed position through a set of predetermined positions in a predetermined repositioning sequence during an orbit of said satellite.

2. The satellite of claim 1, wherein said first thermal radiator is in a non-operational state when moving from said stowed position to said first deployed position, wherein said first thermal radiator initiates an operational state only after reaching said first deployed position, and wherein said first thermal radiator is in an operational state when said first thermal radiator is moved from said first deployed position to said second deployed position.

3. The satellite of claim 1, wherein a change in position of said first thermal radiator in moving from said stowed position to said first deployed position is of a first magnitude, and wherein a change in position of said first thermal radiator in moving from said first deployed position to said second deployed position is of a second magnitude that is less than said first magnitude.

4. The satellite of claim 1, wherein said satellite is in a geosynchronous orbit.

5. The satellite of claim 1, wherein said first thermal radiator is a cantilevered structure that comprises a first free end, wherein a distance of said first free end from Earth progressively increases during movement of said first thermal radiator from said stowed position.

6. The satellite of claim 1, wherein said first thermal radiator is a cantilevered structure that comprises a first free end, wherein during movement of said first thermal radiator from said stowed position, said first free end progressively moves further in the direction of travel of said satellite along its orbital path.

7. The satellite of claim 1, wherein said first thermal radiator is a cantilevered structure that comprises a first free end, wherein during movement of said first thermal radiator from said stowed position, said first free end progressively moves further in an opposite direction to a direction of travel of said satellite along its orbital path.

8. The satellite of claim 1, further comprising a nadir panel that always faces Earth when said satellite is in orbit, and an anti-nadir panel that is opposite said nadir panel and that always faces directly away from Earth when said satellite is in said orbit, wherein said first thermal radiator is located at an altitude from Earth that is between an altitude of said nadir panel from Earth and an altitude of said anti-nadir panel from Earth when said first thermal radiator is in said stowed position, and wherein said anti-nadir panel is located at an altitude from Earth that is between an altitude of said nadir panel from Earth and an altitude of said first thermal radiator from Earth when said first thermal radiator is in said first deployed position.

9. The satellite of claim 1, further comprising a nadir panel that always faces Earth when said satellite is in orbit, and an anti-nadir panel that is opposite said nadir panel and that always faces directly away from Earth when said satellite is in said orbit, wherein said first thermal radiator extends beyond said anti-nadir panel in an anti-nadir direction when in said first deployed position.

10. The satellite of claim 1, wherein said first thermal radiator is articulatable about a single reference axis in moving from said first deployed position to said second deployed position.

11. The satellite of claim 10, wherein said first thermal radiator moves about said single reference axis in moving from said stowed position to said first deployed position.

12. The satellite of claim 1, wherein said first thermal radiator is articulatable about both first and second reference axes in moving from said first deployed position to said second deployed position.

13. The satellite of claim 12, wherein said first thermal radiator moves about said first reference axis in moving from said stowed position to said first deployed position.

14. The satellite of claim 1, further comprising
   a first gimbal movably interconnecting said first thermal radiator and said body, wherein said first gimbal accommodates movement of said first thermal radiator from said stowed position to said first deployed position, and further accommodates movement of said first thermal radiator from said first deployed position to said second deployed position.

15. The satellite of claim 1, further comprising
   first and second gimbals movably interconnecting said first thermal radiator and said body, wherein said first gimbal accommodates movement of said first thermal radiator from said stowed position to said first deployed position, and further accommodates movement of said first thermal radiator from said first deployed position to said second deployed position, wherein said second gimbal alone is unable to accommodate movement of said first thermal radiator from said stowed position to said first deployed position, and wherein said second gimbal accommodates movement of said first thermal radiator from said first deployed position to said second deployed position.

16. A method for operating a satellite, comprising the steps of:

deploying a first thermal radiator from a stowed position to a first deployed position;

repositioning said first thermal radiator from said first deployed position through a set of predetermined positions in a predetermined repositioning sequence during an orbit of said satellite; and accommodating, with a notch formed in a distal portion of said first thermal radiator, an attachment of a solar array to an attachment locale positioned on a body of said satellite when said first thermal radiator is in said stowed position.

17. The method of claim 16, further comprising the step of initiating operation of said first thermal radiator only after said deploying step.

18. The method of claim 16, wherein a change in a position of said first thermal radiator in moving from said stowed position to said first deployed position is of a first magnitude, and wherein a change in position of said first thermal radiator in moving from said first deployed position to a second deployed position is of a second magnitude that is less than said first magnitude.

19. The method of claim 16, further comprising the step of transferring said satellite to a geosynchronous orbit.

20. A satellite, comprising:

a body;

an attachment locale positioned on said body, wherein said attachment locale is configured to accommodate an attachment of a solar array;

a first thermal radiator, wherein said first thermal radiator is deployable from a stowed position to a first deployed position, wherein said first thermal radiator further is articulatable after said first thermal radiator is in said first deployed position to move said first thermal radiator from said first deployed position to at least a second deployed position, wherein said first thermal radiator includes a notch formed in a distal portion of said first thermal radiator, and wherein said notch is configured to accommodate the attachment of said solar array at said attachment locale when said first thermal radiator is in said stowed position; and a controller operatively interconnected with said first thermal radiator, wherein said controller is operative to reposition said first thermal radiator during an orbit of said satellite.

* * * * *